(12) United States Patent
Lee et al.

(10) Patent No.: US 7,279,202 B2
(45) Date of Patent: Oct. 9, 2007

(54) LIQUID CRYSTALLINE COMPOUND FOR VERTICAL ALIGNMENT AND A LIQUID CRYSTALLINE COMPOSITION COMPRISING THE SAME

(75) Inventors: Eun Kyung Lee, Seoul (KR); Jee Hwan Jang, Gyeonggi-Do (KR); Jong Seob Kim, Gyeonggi-Do (KR); Ji Young Jong, Seoul (KR); Hyung Soo Cho, Daegu-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 318 days.

(21) Appl. No.: 10/928,154

(22) Filed: Aug. 30, 2004

(65) Prior Publication Data

US 2005/0199857 A1 Sep. 15, 2005

(30) Foreign Application Priority Data

Nov. 27, 2003 (KR) ...................... 10-2003-0084932

(51) Int. Cl.
*C09K 19/34* (2006.01)
*C09K 19/12* (2006.01)
*C07C 25/13* (2006.01)

(52) U.S. Cl. .................. 428/1.1; 428/1.3; 252/299.61; 252/299.66; 570/129

(58) Field of Classification Search ................ 428/1.1, 428/1.3; 252/299.63, 299.66, 299.01; 570/129
See application file for complete search history.

(56) References Cited

U.S. PATENT DOCUMENTS 6,348,244 B1 2/2002 Miyazawa et al.

6,896,939 B2 * 5/2005 Klasen-Memmer et al. ........................ 428/1.1

FOREIGN PATENT DOCUMENTS

| EP | 1352943 | * | 10/2003 |
| GB | 2339778 | * | 2/2000 |
| JP | 08-40953 | * | 2/1996 |

OTHER PUBLICATIONS

English translation by computer for JP 08-40953, http://www4.ipdl.ncipi.go.jp/Tokujitu/PAJdetail.ipdl?N0000=60&N0120=01&N2001=2&N3001=H08-040953.*
CAPLUS 2000: 68533.*
CAPLUS 2003: 815300.*

* cited by examiner

*Primary Examiner*—Shean C Wu
(74) *Attorney, Agent, or Firm*—Roylance, Abrams, Berdo & Goodman, L.L.P.

(57) ABSTRACT

A vertical alignment liquid crystalline compound containing a laterally substituted aromatic cyclic moiety. The liquid crystalline compound has a wide temperature range of the nematic phase, a high optical anisotropy and a high negative dielectric anisotropy. In addition, since the rotation viscosity and the K33/K11 ratio of the liquid crystalline compound are maintained at a low level, the liquid crystalline compound can be effectively used as a liquid crystalline medium having good image quality and a high response speed even when applied to thin liquid crystalline cells.

12 Claims, 2 Drawing Sheets

LIQUID CRYSTALLINE COMPOUND FOR VERTICAL ALIGNMENT AND A LIQUID CRYSTALLINE COMPOSITION COMPRISING THE SAME

BACKGROUND OF THE INVENTION

This non-provisional application claims priority under 35 U.S.C. § 119(a) on Korean Patent Application No. 2003-84932 filed on Nov. 27, 2003, which is herein incorporated by reference.

FIELD OF THE INVENTION

The present invention relates to a novel liquid crystalline compound and a liquid crystalline composition comprising the same, and more particularly to a liquid crystalline compound for vertical alignment containing a laterally substituted aromatic cyclic moiety and a liquid crystalline composition comprising the liquid crystalline compound.

DESCRIPTION OF THE RELATED ART

A variety of flat panel displays, including liquid crystal displays (LCDs), field emission displays (FEDs), plasma display panels (PDPs) and electroluminescent display (ELDs), are very slim and lightweight, and can be fabricated to have a large area. Based on these advantages, flat panel displays are increasingly used in a wide variety of applications, such as notebook monitors and display devices for use in aircraft cockpit compartments, medical devices, navigational instruments, measuring instruments, and the like.

Liquid crystalline displays (LCDs) have the highest market share of the flat panel display products because of their easy portability and low power consumption. Liquid crystalline displays can be classified into projection type LCDs and direct view type LCDs. The direct view type LCDs are devices where a viewer can directly view light generated from the LCDs, and they are sub-classified into transmissive and reflective LCDs. The former is a device wherein the intensity of light produced from a backlight is regulated by an LCD panel, and the latter is a device wherein natural light and ambient light are reflected from the LCD panel to form desired images. In particular, a noticeable display device, LCOS (Liquid Crystal on Silicon) microdisplay comprises a silicon back plate and a cover glass, both of which are conductors and have mirror-like surfaces as a pixel array, and a liquid crystalline material is introduced between the two components. Although the LCOS microdisplay has a diagonal length of 1 inch or below, high-resolution images can be obtained. Since the LCOS microdisplay generally has small-sized pixels, it is composed of about 1 μm thick thin cells. In view of d·Δn values, liquid crystalline media used in the LCOS microdisplay are required to have a high optical anisotropy of more than 0.1, unlike a general transmissive liquid crystalline display having an optical anisotropy (i.e., refractive index anisotropy (Δn)) of 0.1 or less. For this purpose, it is contemplated that a biphenyl or terphenyl group is introduced into a liquid crystalline compound to increase the number of conjugation sites, thereby improving the polar anisotropy in a long axial direction of the liquid crystalline compound. But, this method increases π-π stacking interaction and thus causes the liquid crystalline compound to be crystallized at room temperature, leading to a serious problem of poor reliability not allowable for liquid crystalline displays.

Liquid crystalline compounds applied to a vertical alignment (VA) technology should exhibit a relatively high negative dielectric anisotropy. In addition, these liquid crystalline compounds for VA are required to have the following properties: (1) a particular optical anisotropy in their liquid crystalline phase; (2) a low K33/K11 ratio and a low rotation viscosity so as to ensure a high response speed; (3) a chemical stability against external factors such as UV rays, heat, infrared rays, air, electric fields, etc.; and a liquid crystalline phase over a broad temperature range.

There has been no report regarding a single liquid crystalline compound simultaneously having a high optical anisotropy and a high negative dielectric anisotropy sufficient to be fabricated into VA mode thin liquid crystalline cells, until now. Accordingly, liquid crystalline compositions comprising about 5 to 25 liquid crystalline compounds are currently used to exhibit intended liquid crystalline properties, but they fail to satisfy the above-mentioned requirements for an ideal VA liquid crystalline composition. Thus, there is a need for a novel liquid crystalline compound having a high optical anisotropy, a high negative dielectric anisotropy, a low rotation viscosity and a broad liquid crystalline temperature range.

SUMMARY OF THE INVENTION

According to the present invention it has been found that a liquid crystalline compound containing a particular aromatic cyclic moiety laterally substituted with an alkyl, alkenyl, alkoxy group or a derivative thereof has a high negative dielectric anisotropy, a high optical anisotropy, a low rotation viscosity, a low K33/K11 ratio and a broad liquid crystalline temperature range.

Therefore, a feature of the present invention is to provide a novel liquid crystalline compound which can be applied to VA mode thin liquid crystalline cells and has a high response speed while ensuring good image quality.

In accordance with a feature of the present invention, there is provided a liquid crystalline compound represented by Formula 1 below:

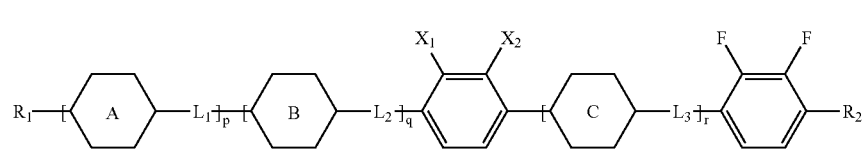

Formula 1 wherein $R_1$ and $R_2$ are each independently $C_{1\sim20}$ alkyl, $C_{1\sim20}$ alkenyl, $C_{1\sim20}$ alkoxy, $C_{1\sim20}$ alkenyloxy, $C_{3\sim20}$ cycloalkyl or $C_{6\sim20}$ aryl group in which at least one hydrogen atom may be substituted with a halogen atom; $X_1$ and $X_2$ are each independently a hydrogen atom, a halogen atom, or $C_{1\sim10}$ alkyl, alkoxy, alkenyl or alkenyloxy group in which at least one hydrogen atom may be substituted with a halogen atom, with the proviso that both of $X_1$ and $X_2$ are not simultaneously a hydrogen atom or a halogen atom; $L_1$, $L_2$ and $L_3$ are each independently a single bond, $C_{1-7}$ alkylene, $C_{2-7}$ divalent unsaturated hydrocarbon group containing at least one double or triple bond, —COO—, —OCO—, —CH$_2$O—, —CF$_2$O—, —OCF$_2$—, —OCH$_2$—, —NHCH$_2$—, —CH$_2$NH—, —CH$_2$CO—, —COCH$_2$—, —N=N— or —NON—; p, q, and r are each independently an integer of 0 to 2, with the proviso that all of p, q, and r are not simultaneously zero; and

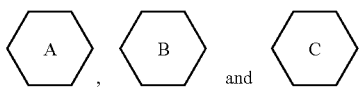

are each independently a 1,4-cyclohexylene, 1,4-phenylene or cyclohexene-1,4-diyl group, in which at least one hydrogen atom may be substituted with a halogen atom.

In accordance with another feature of the present invention, there is provided a liquid crystalline composition comprising the liquid crystalline compound of Formula 1.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Hereinafter, the present invention will be explained in more detail.

Figure 1A:
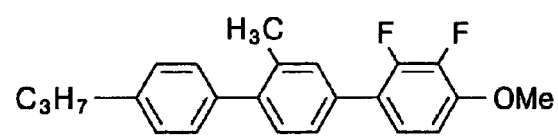
FIGS. 1a and 1b are images showing phase change of liquid crystalline compositions.
Figure 1A:
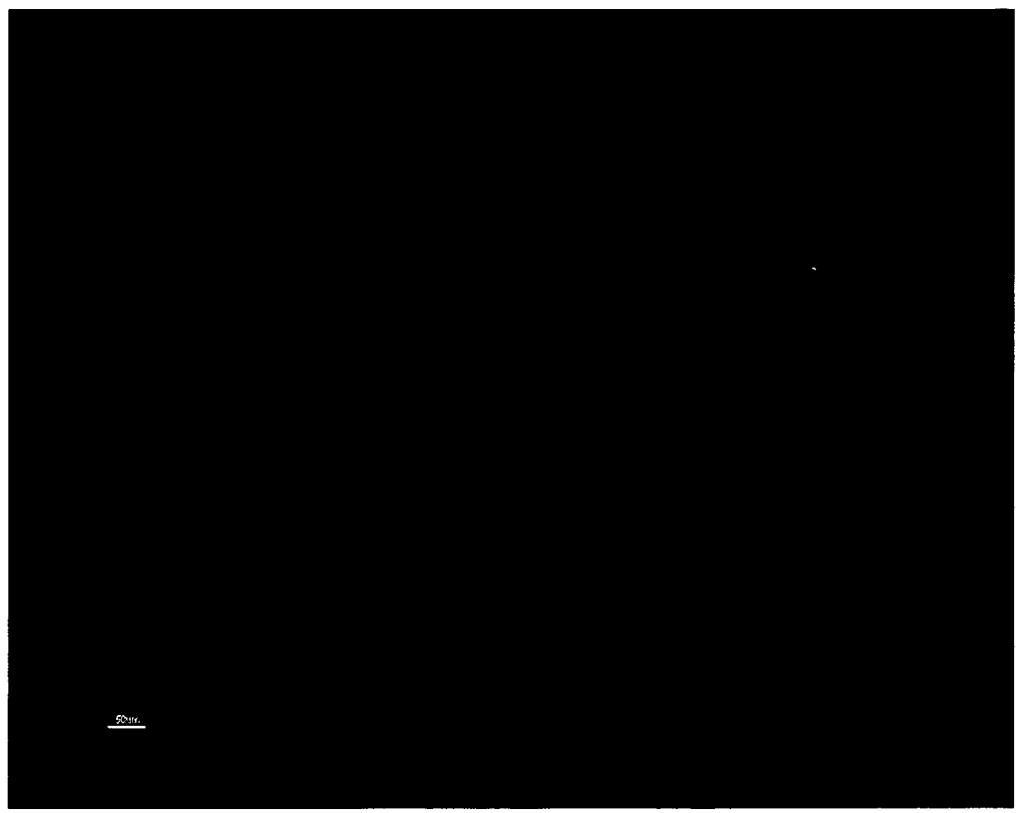
Figure 1B:
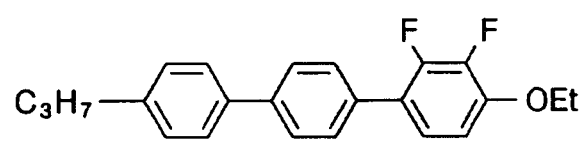
Figure 1B:

The liquid crystalline compound of Formula 1 contains a phenylene moiety laterally substituted with an alkyl, alkenyl or alkoxy group and the polar anisotropy in the long axial direction of the liquid crystalline compound is improved, thereby showing a high optical anisotropy without crystallization due to π-π stacking interaction. This can be confirmed from FIGS. 1a and 1b. FIGS. 1a and 1b are images showing the phase change of liquid crystalline compositions respectively containing the laterally substituted liquid crystalline compound shown in FIG. 1a and the laterally non-substituted liquid crystalline compound shown in FIG. 1b. The laterally substituted or non-substituted compound is mixed with a liquid crystalline material of Table 1 below. The images were taken from a test cell containing the liquid crystalline mixture without impressed voltage at room temperature. As seen in FIG. 1b, crystallization occurred, even at room temperature, when the laterally non-substituted liquid crystalline compound is mixed.

TABLE 1

| N | Compounds | Content (%) |
|---|---|---|
| 1 | $C_3H_7$—[cyclohexyl]—[phenyl]—$OC_2H_5$ | 2 |
| 2 | $C_nH_{2n+1}$—[cyclohexyl]—[phenyl(F,F)]—$OC_2H_5$ | 2 |
| 3 | $C_nH_{2n+1}$—[cyclohexyl]—[phenyl(F,F)]—$OC_4H_9$ | 2 |
| 4 | $H_5C_2$—[phenyl]—[phenyl(F,F)]—[phenyl(F)]—$CH_3$ | 15 |
| 5 | $H_7C_3$—[phenyl]—[phenyl(F,F)]—[phenyl]—$C_2H_5$ | 15 |

TABLE 1-continued

| N | Compounds | Content (%) |
|---|---|---|
| 6 | 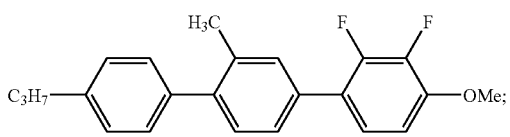 | 24 |
| 7 | 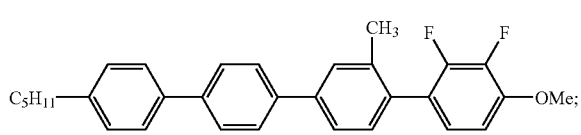 | 8 |
| 8 | 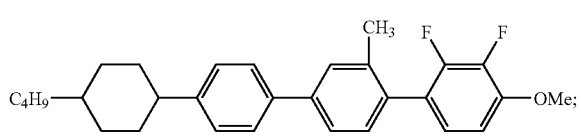 | 32 |

Further, the liquid crystalline compound of Formula 1 contains a fluoro-substituted phenylene moiety and shows a high negative dielectric anisotropy.

Preferred embodiments of the liquid crystalline compound according to the present invention are those wherein $R_1$ is a $C_{2-10}$ alkyl group, $R_2$ is a $C_{2-10}$ alkoxy group; one of $X_1$ and $X_2$ is a hydrogen atom, and the other is methyl, ethyl, ethenyl, propyl, allyl, methoxy, ethoxy or propoxy group in which at least one hydrogen may be substituted with a halogen atom; and $L_1$ and $L_2$ are each independently a single bond, methylene, ethylene, —CH=CH—, —C≡C—, —COO—, —OCO—, —CH$_2$O—, —CF$_2$O—, —OCF$_2$— or —OCH$_2$—.

Preferred embodiments of the liquid crystalline compounds according to the present invention are those represented by Formulae 2 to 7 below:

Formula 2

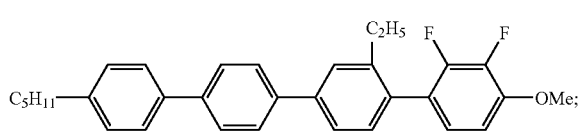

Formula 3

Formula 4

Formula 5

-continued

Formula 6

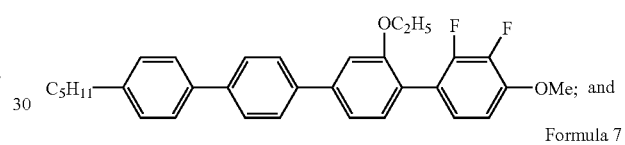

Formula 7

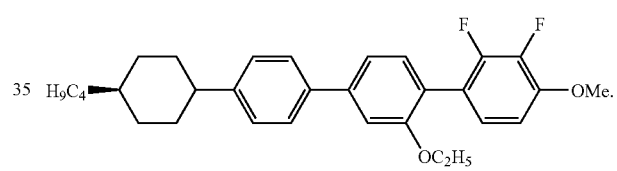

The compound of the present invention can be prepared through appropriate synthetic paths. For example, an alkyl terphenyl or alkyl quaterphenyl compound containing a phenylene moiety laterally substituted with an alkyl group as in Formula 2 is prepared in accordance with the following procedure. First, alkylated magnesium iodide is reacted with 3,6-disubstituted cyclohexanone to yield a diene compound. Thereafter, the diene compound is aromatized to the target compound (See, Reaction Schemes 1 and 2).

The present invention also provides a liquid crystalline composition comprising the compound of Formula 1. The liquid crystalline compounds of Formula 1 may be used alone or in combination. Alternatively, a previously known liquid crystalline compound may be further added in order to appropriately control the physical properties and various optical parameters of the liquid crystalline composition. Examples of such known liquid crystalline compounds include, but are not limited to, liquid crystalline compounds containing a cyclohexylphenyl group for viscosity reduction. Specific examples of known liquid crystalline compounds are as follows (see, e.g., V. Reiffenrath et al., Liq. Cryst., 5(1) 159 (1989): M. Klasen-Memmer et. al., IDW (international display workshop) 2002, 93 (Hiroshima, Japan) M. Heckmeier et al., U.S. Pat. No. 6,514,580 (2003): K. Miyazawa et al., U.S. Pat. No. 6,348,244 (2002)):

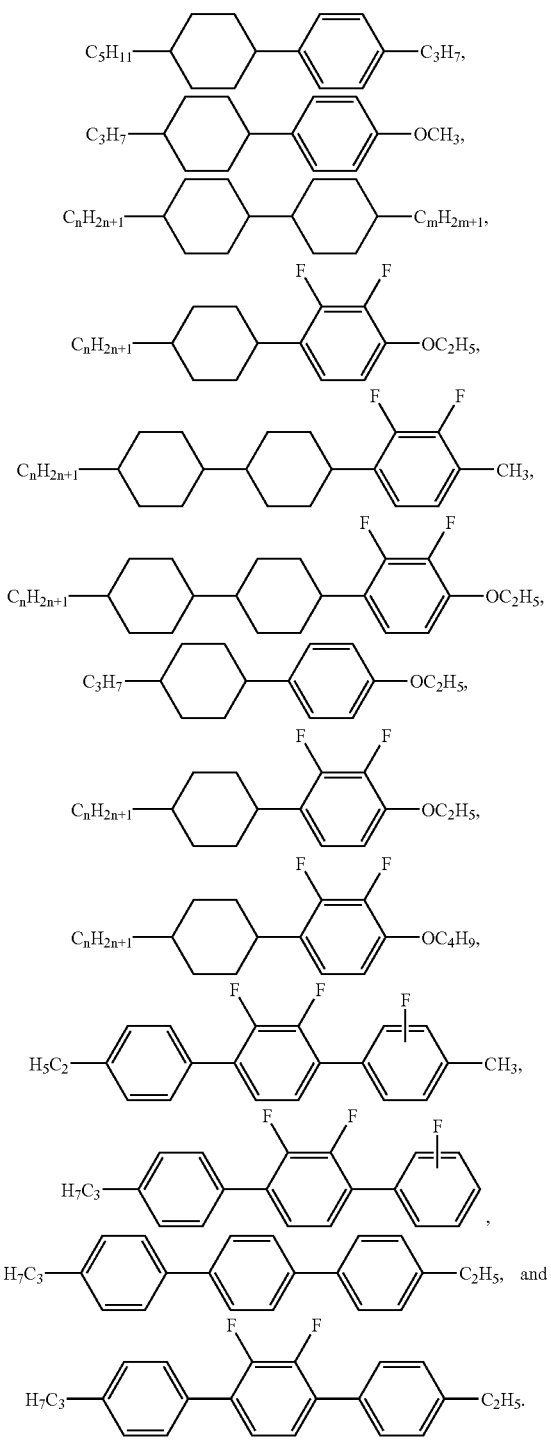

wherein n is an integer of from 1 to 10 and n+m is in the range of 5~10, but n and m are not specifically limited to these ranges.

The content of the liquid crystalline compound according to the present invention in the liquid crystalline composition is not especially limited, but is preferably in the range of 5~60% by weight, based on the total weight of the composition. The liquid crystalline composition of the present invention has preferably an optical anisotropy as high as 0.05~0.30, and more preferably 0.15~0.25. The liquid crystalline composition of the present invention has an absolute value of 3 or more (i.e., −3.0 or less) in negative dielectric anisotropy and is appropriate for the use in VA mode thin liquid crystalline cells.

Hereinafter, the present invention will be described in more detail with reference to the following preferred examples. However, these examples are given for the purpose of illustration and are not to be construed as limiting the scope of the invention.

EXAMPLES

Synthetic Example 1

4-Pentyl-3″-methyl-2′″,3′″-difluoro-4′″-methoxyquaterphenyl

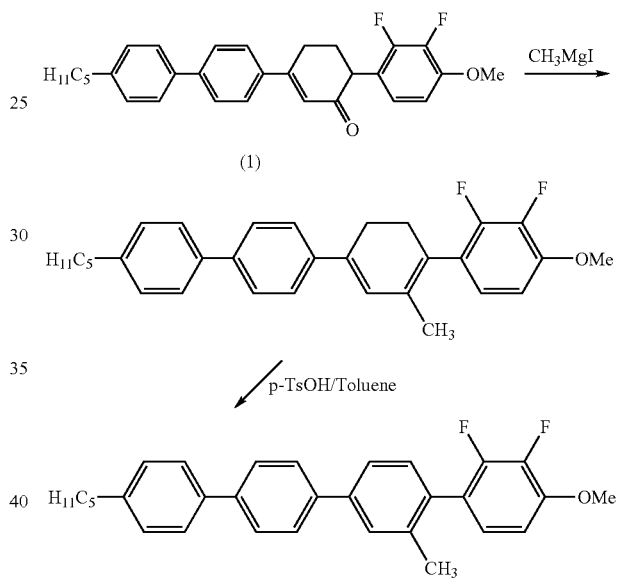

2-cyclohexenone compound (1) is prepared according to a method disclosed in Liquid Crystals, 2001, Vol. 28, No. 12, 1775-1760, Liquid Crystals: Proc. SPIE Vol. 4759. 0.1 mole of the 2-cyclohexenone compound (1) above is dissolved in 150 ml of dry THF. To the solution is added a solution of 0.12 moles of methylmagnesium iodide in 100 ml of dry ether. The reaction mixture is stirred at room temperature overnight. After 100 ml of 10% hydrochloric acid is added to the reaction mixture and stirred, the resulting mixture is left for phase separation. The obtained organic layer is washed with water several times, and dried over anhydrous magnesium sulfate. The remaining solvents are evaporated and the mixtures is loaded onto a silica gel packed column and then filtered. The ether is removed from the filtrate and the concentrate is dissolved in 100 ml of toluene. Then, 0.1 mole of p-Toluenesulfonic acid is added and the solution is refluxed for 24 hours. After 100 ml of sat. sodium hydrogen carbonate solution is added to the reaction mixture and stirred, the resulting mixture is left for phase separation. The obtained organic layer is washed with water several times, and dried over anhydrous magnesium sulfate. The magnesium sulfate is removed from the filtrate and the remaining solvents are evaporated to yield the target compound of Formula 3 as a white solid (see, the above Reaction Scheme 1). The compound is recrystallized in isopropyl alcohol (yield: 41%).

The molecular mass of the compound is determined by GC mass, showing the following result:

GC mass data: m/z 456 (>99%).

In addition, $^1$H NMR data was measured showing the following result:

$^1$H NMR data: 7.7 ppm (m, 5H), 7.6 ppm (m, 4H), 7.4 ppm (d, 1H), 7.2 ppm (m, 1H), 7.0 ppm (t, 1H), 6.8 ppm (t, 1H), 4.0 ppm (s, 3H), 2.7 ppm (t, 2H), 1.7 ppm (m, 2H), 1.5 ppm (s, 3H), 1.3 ppm (m, 4H), 0.9 ppm (t, 3H)

Synthetic Examples 2 and 3

Cyclohexenone compounds (2) and (3) below are prepared according to a method disclosed in Liquid Crystals, 2001, Vol. 28, No. 12, 1775-1760, Liquid Crystals: Proc. SPIE Vol. 4759.

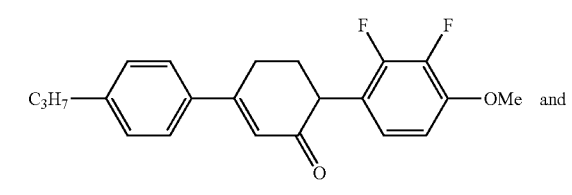

(2)

and

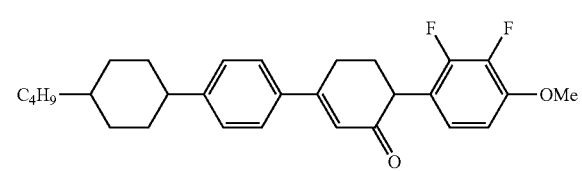

(3)

Then, compounds of Formulae 2 and 4 are prepared in the same manner as in Synthetic Example 1, except that 0.1 mole of the 2-cyclohexenone compound (2) (Synthetic Example 2) and 0.1 mole of the 2-cyclohexene compound (3) (Synthetic Example 3) are used, respectively. The yields of the compounds of Formulae 2 and 4 are 52% and 60%, respectively.

The molecular mass of the liquid crystalline compounds thus prepared is determined by GC mass, showing the following results:

GC mass data: m/z 356 (>99%)
GC mass data: m/z 452 (>99%)

Synthetic Example 4

The compound of Formula 5 is prepared in the same manner as in Synthetic Example 1, except that 0.12 moles of ethylmagnesium iodide are used (yield: 50%).

The molecular mass of the liquid crystalline compound thus prepared is determined by GC mass, showing the following result:

GC mass data: m/z 470 (>99%)

Synthetic Example 5

Reaction Scheme 2

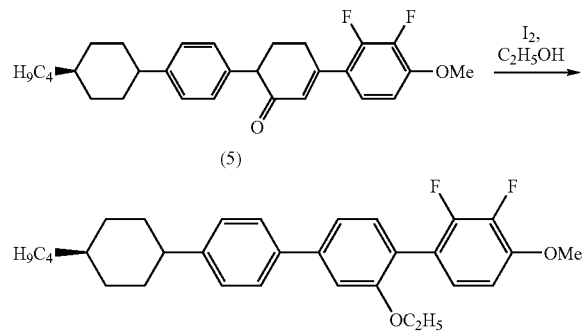

2-cyclohexenone compound (5) is prepared according to a method disclosed in Liquid Crystals, 2001, Vol. 28, No. 12, 1775-1760, Liquid Crystals: Proc. SPIE Vol. 4759. Then, 0.1 moles of the 2-cyclohexenone compound (5) is dissolved in 150 ml of ethanol, and 1 g of iodine is added thereto. After the reaction mixture is refluxed at 100° C. for 24 hours, it is allowed to cool to room temperature and then water and ether are added thereto. The obtained organic layer is washed with sodium sulfite and water several times, and is subsequently dried over anhydrous magnesium sulfate. The remaining solvents are evaporated and the concentrate is dissolved in ether. The ether solution is loaded onto a silica gel packed column and then filtered. The ether is removed from the filtrate to yield the target compound of Formula 7 as a white solid (see the above Reaction Scheme 2). The compound is recrystallized in isopropyl alcohol (yield: 48%).

The molecular mass of the compound is determined by GC mass, showing the following result:

GC mass data: m/z 478 (>99%).

In addition, $^1$H NMR data was measured showing the following result:

$^1$H NMR data: 7.8 ppm (d, 2H), 7.5~7.2 ppm (m, 5H), 7.0 ppm (t, 1H), 6.8 ppm (t, 1H), 4.1 ppm (q, 2H), 3.9 ppm (s, 3H), 2.5 ppm (m, 1H), 2.5 ppm (m, 4H), 1.9 ppm (m, 5H), 1.3 ppm (m, 10H), 1.0 ppm (m, 2H), 0.9 ppm (t, 3H)

The phase transition temperature, the optical anisotropy (Δn) and the dielectric anisotropy (Δε) of the liquid crystalline compounds of formulae 2-5 and 7 are measured, and the results are shown in Table 2 below. Specifically, the respective liquid crystalline properties are measured in accordance with the following procedures. The prepared liquid crystalline compound is mixed with a liquid crystalline composition of Table 1 above. After the liquid crystalline composition containing the prepared liquid crystalline compound is injected into a vertically aligned liquid crystalline cell, the dielectric anisotropy (Δε) is measured using a measurement system (Model 6254, Toyo Company) at 20° C. and 0.1 Hz. The optical anisotropy (Δn) is obtained by measuring the refractive index to normal light and abnormal light at 20° C. using an interference filter of an Abbe refractometer (589 nm). The phase transition temperature is measured using a polarization microscope equipped with a hot stage while maintaining a heating/cooling speed of ±2° C./min. Parameters in connection with the electro-optical properties are as follows:

Tni (° C.): Nematic-isotropy transition temperature
Δn: Optical anisotropy vale at 20° C. (measured at 589 nm)
Δε: Dielectric anisotropy at 20° C. (measured at 0.1 Hz)

TABLE 2

| Structure | | Phase transition temperature | Δn | Δε |
|---|---|---|---|---|
| 1 | $C_3H_7$—[Ph]—[Ph(CH_3)]—[Ph(F,F)]—OMe | Cr(41) N87 I | 0.210 | −6.1 |
| 2 | $C_5H_{11}$—[Ph]—[Ph]—[Ph(CH_3)]—[Ph(F,F)]—OMe | Cr(41) N87 I | 0.342 | −5.8 |
| 3 | $C_4H_9$—[Cy]—[Ph]—[Ph(CH_3)]—[Ph(F,F)]—OMe | Cr(41) N87 I | 0.239 | −5.9 |
| 4 | $C_5H_{11}$—[Ph]—[Ph]—[Ph(C_2H_5)]—[Ph(F,F)]—OMe | Cr(41) N87 I | 0.304 | −4.8 |
| 5 | $H_9C_4$—[Cy]—[Ph]—[Ph(OC_2H_5)]—[Ph(F,F)]—OMe | Cr(41) N87 I | 0.219 | −3.7 |

As can be seen from the results shown in Table 2, the liquid crystalline compounds have an optical anisotropy as high as 0.2 or more, and a relatively high dielectric anisotropy. In addition, the liquid crystalline compounds advantageously have an increased phase transition temperature.

Liquid Crystalline Compositions

Liquid crystalline compositions 1 to 6 comprising the liquid crystalline compounds prepared in the Synthetic Examples are prepared. The optical anisotropy (Δn), Tni and the dielectric anisotropy (Δε) of the liquid crystalline compositions are measured, and the results are shown in the tables below.

1) Liquid Crystalline Composition 1

| n,m | Liquid crystalline compound | Content % | clearing temp. (° C.) | Δn | Δε |
|---|---|---|---|---|---|
| 1 | $C_2H_5$—[Ph]—[Ph(CH_3)]—[Ph(F,F)]—OMe | 10 | | | |
| 2 | $C_5H_{11}$—[Cy]—[Ph]—$C_3H_7$ | 5 | | | |

-continued

| n,m | Liquid crystalline compound | Content % | clearing temp. (° C.) | Δn | Δε |
|---|---|---|---|---|---|
| 3 | C₃H₇–[cyclohexane]–[benzene]–OCH₃ | 2 | | | |
| 4 m + n = 7<br>m + n = 8 | CₙH₂ₙ₊₁–[cyclohexane]–[cyclohexane]–CₙH₂ₙ₊₁ | 6<br>8 | 68 | 0.094 | −4.13 |
| 5 n = 3<br>n = 5 | CₙH₂ₙ₊₁–[cyclohexane]–[F,F-benzene]–OC₂H₅ | 5<br>7 | | | |
| 6 n = 2<br>n = 3 | CₙH₂ₙ₊₁–[cyclohexane]–[cyclohexane]–[F,F-benzene]–CH₃ | 9<br>10 | | | |
| 7 n = 3<br>n = 5 | CₙH₂ₙ₊₁–[cyclohexane]–[cyclohexane]–[F,F-benzene]–OC₂H₅ | 18<br>20 | | | |

2) Liquid Crystalline Composition 2

| n,m | Liquid crystalline compound | Content % | clearing temp. (° C.) | Δn | Δε |
|---|---|---|---|---|---|
| 1 | C₂H₅–[benzene]–[CH₃-benzene]–[F,F-benzene]–OMe | 10 | | | |
| 2 | C₃H₇–[cyclohexane]–[benzene]–OC₂H₅ | 2 | | | |
| 3 n = 3 | CₙH₂ₙ₊₁–[cyclohexane]–[F,F-benzene]–OC₂H₅ | 1 | | | |
| 4 n = 3 | CₙH₂ₙ₊₁–[cyclohexane]–[F,F-benzene]–OC₄H₉ | 2 | | | |
| 5 | H₅C₂–[benzene]–[F,F-benzene]–[F-benzene]–CH₃ | 11 | 99 | 0.177 | −4.08 |

-continued
| n,m | Liquid crystalline compound | Content % | clearing temp. (° C.) | Δn | Δε |
|---|---|---|---|---|---|
| | 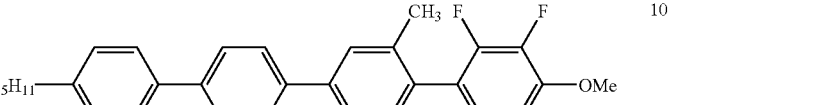 | | | | |
| 6 | 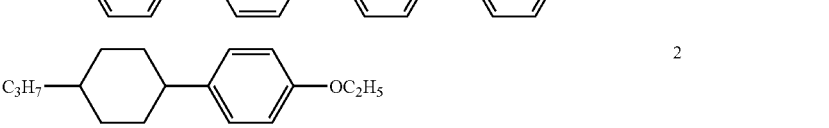 | 11 | | | |
| 7 | | 22 | | | |
| 8 | n = 2<br>n = 3  | 4<br>4 | | | |
| 9 | n = 2<br>n = 3 | 17<br>16 | | | |
3) Liquid Crystalline Composition 3
| n,m | Liquid crystalline compound | Content % | clearing temp. (° C.) | Δn | Δε |
|---|---|---|---|---|---|
| 1 | 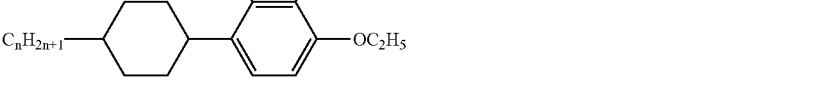 | 10 | | | |
| 2 | | 2 | | | |
| 3 | n = 3 | 1 | | | |
| 4 | n = 3 | 2 | | | |
| 5 | 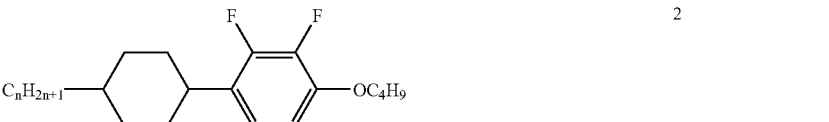 | 11 | 86 | 0.104 | −4.01 |

-continued
| n,m | Liquid crystalline compound | Content % | clearing temp. (° C.) | Δn | Δε |
|---|---|---|---|---|---|
|  | 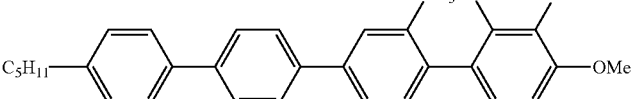 |  |  |  |  |
| 6 |  | 11 |  |  |  |
| 7 |  | 22 |  |  |  |
| 8 | n = 2<br>n = 3 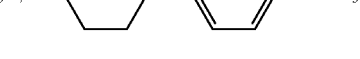 | 4<br>4 |  |  |  |
| 9 | n = 2<br>n = 3 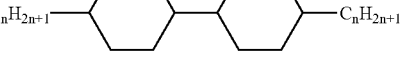 | 17<br>16 |  |  |  |
4) Liquid Crystalline Composition 4
| n | Liquid crystalline compound | Content % | clearing temp. (° C.) | Δn | Δε |
|---|---|---|---|---|---|
| 1 | (C₅H₁₁–⟨⟩–⟨⟩–⟨CH₃⟩–⟨F,F⟩–OMe) | 10 |  |  |  |
| 2 | (C₅H₁₁–⟨cy⟩–⟨⟩–C₃H₇) | 5 |  |  |  |
| 3 | (C₃H₇–⟨cy⟩–⟨⟩–OCH₃) | 2 |  |  |  |
| 4 | m + n = 7<br>m + n = 8 (CₙH₂ₙ₊₁–⟨cy⟩–⟨cy⟩–CₙH₂ₙ₊₁) | 6<br>8 | 86 | 0.096 | −4.01 |
| 5 | n = 3<br>n = 5 (CₙH₂ₙ₊₁–⟨cy⟩–⟨F,F⟩–OC₂H₅) | 5<br>7 |  |  |  |

-continued

| n | | Liquid crystalline compound | Content % | clearing temp. (° C.) | Δn | Δε |
|---|---|---|---|---|---|---|
| 6 | n = 2
n = 3 | C_nH_{2n+1}—[Cy]—[Cy]—[Ph(2,3-F_2)]—CH_3 | 9
10 | | | |
| 7 | n = 3
n = 5 | C_nH_{2n+1}—[Cy]—[Cy]—[Ph(2,3-F_2)]—OC_2H_5 | 18
20 | | | |

5) Liquid Crystalline Composition 5

| n,m | Liquid crystalline compound | Content % | clearing temp. (° C.) | Δn | Δε |
|---|---|---|---|---|---|
| 1 | C_2H_5—[Ph]—[Ph(2-CH_3)]—[Ph(2,3-F_2)]—OMe | 5 | | | |
| | C_5H_{11}—[Ph]—[Ph]—[Ph(2-CH_3)]—[Ph(2,3-F_2)]—OMe | 5 | | | |
| 2 | C_2H_5—[Cy]—[Ph]—OC_2H_5 | 2 | | | |
| 3 | n = 3 | C_nH_{2n+1}—[Cy]—[Ph(2,3-F_2)]—OC_2H_5 | 1 | | | |
| 4 | n = 3 | C_nH_{2n+1}—[Cy]—[Ph(3,4-F_2)]—OC_2H_5 | 2 | | | |
| 5 | H_5C_2—[Ph]—[Ph(2,3-F_2)]—[Ph(F)]—CH_3 | 11 | 107 | 0.189 | −4.2 |
| | H_7C_3—[Ph]—[Ph(2,3-F_2)]—[Ph(F)] | | | | |
| 6 | H_7C_3—[Ph]—[Ph]—[Ph]—C_2H_5 | 11 | | | |

-continued

| n,m | Liquid crystalline compound | Content % | clearing temp. (° C.) | Δn | Δε |
|---|---|---|---|---|---|
| 7 | H₇C₃–[Ph]–[Ph(F,F)]–[Ph]–C₂H₅ | 22 | | | |
| 8 | n = 2<br>n = 3<br>C_nH_{2n+1}–[Cy]–[Cy]–[Ph(F,F)]–OC₂H₅ | 4<br>4 | | | |
| 9 | n = 2<br>n = 3<br>C_nH_{2n+1}–[Cy]–[Ph]–[Ph(F,F)]–OC₂H₅ | 17<br>16 | | | |

6) Liquid Crystalline Composition 6

| n, m | Liquid crystalline compound | Content % | clearing temp. (° C.) | Δn | Δε |
|---|---|---|---|---|---|
| 1 | C₂H₅–[Ph]–[Ph(CH₃)]–[Ph(F,F)]–OMe | 5 | | | |
|  | C₅H₁₁–[Ph]–[Ph]–[Ph(CH₃)]–[Ph(F,F)]–OMe | 5 | | | |
| 2 | C₂H₅–[Cy]–[Ph]–OC₂H₅ | 2 | | | |
| 3 | n = 3<br>C_nH_{2n+1}–[Cy]–[Ph(F,F)]–OC₂H₅ | 1 | | | |
| 4 | n = 3<br>C_nH_{2n+1}–[Cy]–[Ph(F,F)]–OC₄H₉ | 2 | | | |
| 5 | H₅C₂–[Ph]–[Ph(F,F)]–[Ph(F)]–CH₃ | 11 | 99 | 0.164 | −4.72 |

-continued

| n, m | Liquid crystalline compound | Content % | clearing temp. (° C.) | Δn | Δε |
|---|---|---|---|---|---|
|  | H₅C₂—⟨⟩—⟨F,F⟩—⟨F⟩ |  |  |  |  |
| 6 | H₅C₂—⟨⟩—⟨⟩—⟨⟩—C₂H₅ | 11 |  |  |  |
| 7 | H₇C₃—⟨⟩—⟨F,F⟩—⟨⟩—C₂H₅ | 22 |  |  |  |
| 8 | n = 2<br>n = 3<br>CₙH₂ₙ₊₁—⟨⟩—⟨⟩—⟨F,F⟩—OC₂H₅ | 4<br>4 |  |  |  |
| 9 | n = 2<br>n = 3<br>CₙH₂ₙ₊₁—⟨⟩—⟨⟩—⟨F,F⟩—OC₂H₅ | 17<br>16 |  |  |  |

As is evident from the above results, the liquid crystalline compositions comprising the liquid crystalline compound of the present invention have a clearing temperature ranging from 68 to 107° C., a high optical anisotropy ranging from 0.09 to 0.18 and a high negative dielectric anisotropy. Therefore, the liquid crystalline compositions can be very usefully applied to VA mode LCoS microdisplays.

Although the preferred embodiments of the present invention have been disclosed for illustrative purposes, those skilled in the art will appreciate that various modifications, additions and substitutions are possible, without departing from the spirit and scope of the invention as disclosed in the accompanying claims.

What is claimed is:

1. A liquid crystalline compound represented by Formula 1 below:

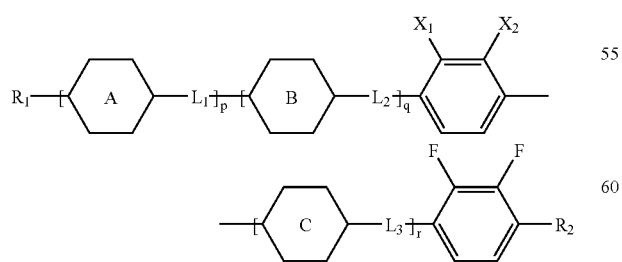

(1)

wherein $R_1$ and $R_2$ are each independently $C_{1\sim20}$ alkyl, $C_{1\sim20}$ alkenyl, $C_{1\sim20}$ alkoxy, $C_{1\sim20}$ alkenyloxy, $C_{3\sim20}$ cycloalkyl or $C_{6\sim20}$ aryl group in which at least one hydrogen atom may be substituted with a halogen atom; $X_1$ and $X_2$ is a $C_{1\text{-}10}$ alkyl or alkoxy group and the other is H or F; $L_1$, $L_2$ and $L_3$ are each independently a single bond, $C_{1\sim7}$ alkylene, $C_{2\sim7}$ divalent unsaturated hydrocarbon group containing at least one double or triple bond, —COO—, —OCO—, —CH₂O—, —CF₂O—, —OCF₂—, —OCH₂—, —NHCH₂—, —CH₂NH—, —CH₂CO—, —COCH₂—, —N=N— or —NON—; p, q, and r are each independently an integer of 0 to 2, with the proviso that all of p, q, and r are not simultaneously zero;

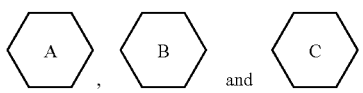

are each independently a 1,4-cyclohexylene, 1,4-phenylene or cyclohexene-1,4-diyl group, in which at least one hydrogen atom may be substituted with a halogen atom.

2. The liquid crystalline compound according to claim 1, wherein the liquid crystalline compound is one of compounds represented by Formulae 2 to 7 below:

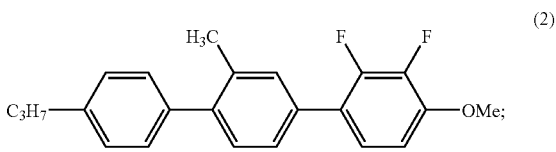

(2)

-continued (3)
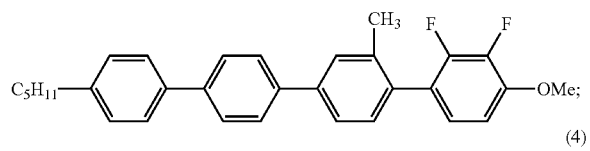

(4)
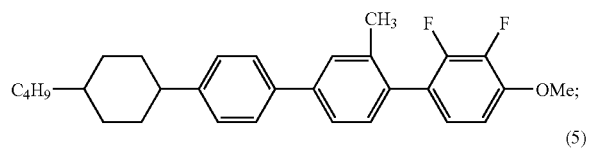

(5)
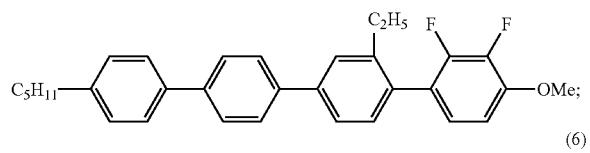

(6)
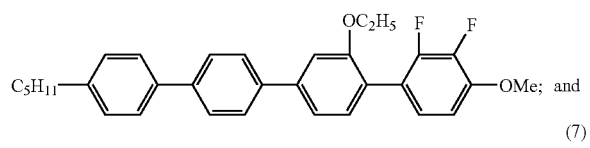

(7)
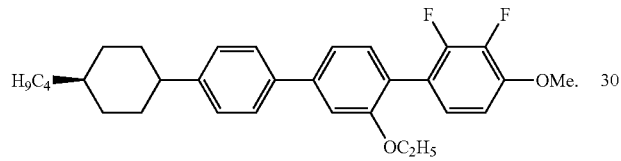

3. A liquid crystalline composition comprising the liquid crystalline compounds according to claim 1.

4. The liquid crystalline composition according to claim 3, wherein the liquid crystalline compounds are selected from the group consisting of the compounds represented by Formulae 2 to 7 below:

(2)
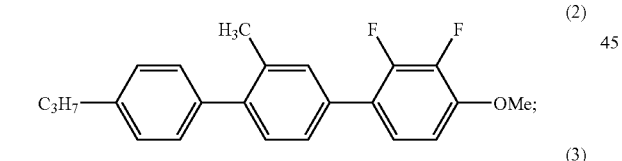

(3)
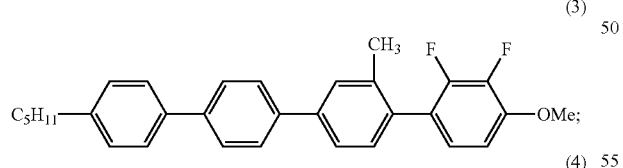

(4)
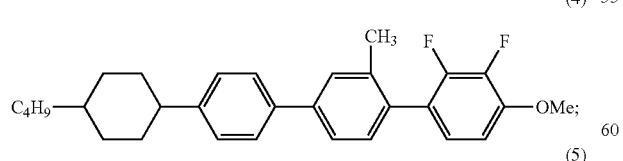

(5)
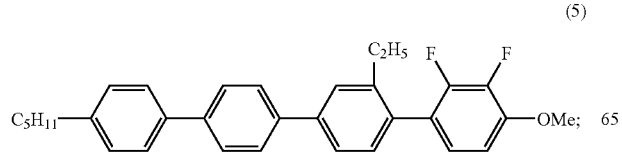

-continued (6)
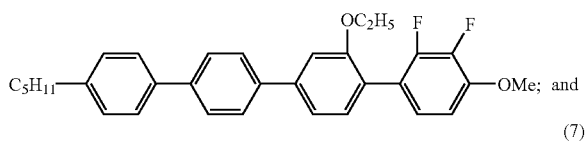

(7)
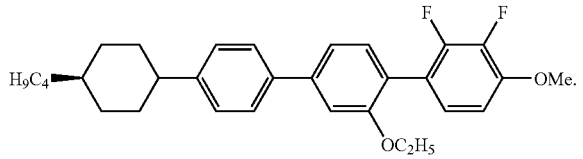

5. The liquid crystalline composition according to claim 3, wherein the liquid crystalline composition has an optical anisotropy of 0.05~0.30.

6. The liquid crystalline composition according to claim 3, wherein the liquid crystalline composition has a negative dielectric anisotropy.

7. A liquid crystalline display, comprising:
a pair of electrode substrates; and
a liquid crystalline layer interposed between the two electrode substrates,
wherein the liquid crystalline layer contains the liquid crystalline composition according to claim 3.

8. A liquid crystalline display, comprising:
a pair of electrode substrates; and
a liquid crystalline layer interposed between the two electrode substrates,
wherein the liquid crystalline layer contains the liquid crystalline composition according to claim 4.

9. A liquid crystalline display, comprising:
a pair of electrode substrates; and
a liquid crystalline layer interposed between the two electrode substrates,
wherein the liquid crystalline layer contains the liquid crystalline composition according to claim 5.

10. A liquid crystalline display, comprising:
a pair of electrode substrates; and
a liquid crystalline layer interposed between the two electrode substrates,
wherein the liquid crystalline layer contains the liquid crystalline composition according to claim 6.

11. The liquid crystalline display according to claim 7, wherein the liquid crystalline display is a TFT-LCD or LcoS (Liquid Crystal on Silicon) using the vertical alignment (VA) mode.

12. A liquid crystalline compound represented by Formula 1, (1)
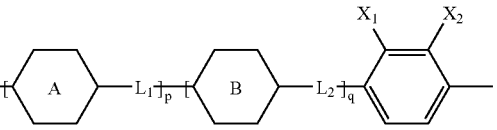

-continued

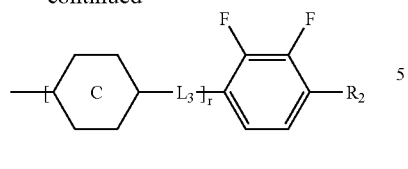

wherein $R_1$ is a $C_{2-10}$ alkyl group, $R_2$ is a $C_{2-10}$ alkoxy group, one of $X_1$ and $X_2$ is a hydrogen atom, and the other is methyl, ethyl, ethenyl, propyl, allyl, methoxy, ethoxy or propoxy group, $L_1$ and $L_2$ are each independently a single bond, methylene, ethylene, —CH=CH—, —CH≡C—, —COO—, —OCO—, —CH$_2$O—, —CF$_2$O—, —OCF$_2$— or —OCH$_2$— p, q, and r are each independently an integer of 0 to 2, with the proviso that all of p, q, and r are not simultaneously zero;

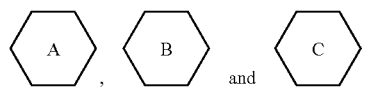

are each independently a 1,4-cyclohexylene, 1,4-phenylene or cyclohexene-1,4-diyl group, in which at least one hydrogen atom may be substituted with a halogen atom.

* * * * *